United States Patent
Jung et al.

(10) Patent No.: US 8,313,851 B2
(45) Date of Patent: Nov. 20, 2012

(54) LITHIUM RECHARGEABLE BATTERY

(75) Inventors: Sang Sok Jung, Youngin-si (KR); Se Yun Kim, Youngin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 757 days.

(21) Appl. No.: 11/239,655

(22) Filed: Sep. 28, 2005

(65) Prior Publication Data
US 2006/0099494 A1 May 11, 2006

(30) Foreign Application Priority Data

Oct. 1, 2004 (KR) .................. 10-2004-0078188

(51) Int. Cl.
*H01M 2/36* (2006.01)
*H01M 2/08* (2006.01)
*H01M 6/10* (2006.01)
*H01M 2/02* (2006.01)

(52) U.S. Cl. ............ 429/72; 429/94; 429/174; 429/164; 429/181

(58) Field of Classification Search ............. 429/72, 429/94, 164, 174, 181
See application file for complete search history.

(56) References Cited

U.S. PATENT DOCUMENTS

| | | | |
|---|---|---|---|
| 5,372,897 A | 12/1994 | Kozawa et al. | |
| 6,045,944 A * | 4/2000 | Okada et al. | 429/163 |
| 6,146,785 A | 11/2000 | Rigobert et al. | |
| 6,294,287 B1 | 9/2001 | Lee et al. | |
| 6,893,772 B2 * | 5/2005 | Howard | 429/94 |
| 2003/0008088 A1 | 1/2003 | Matsubara et al. | |
| 2003/0129487 A1 | 7/2003 | Inoue et al. | |
| 2003/0180582 A1 * | 9/2003 | Masumoto et al. | 429/7 |
| 2004/0115521 A1 | 6/2004 | Cho | |
| 2004/0251872 A1 * | 12/2004 | Wang et al. | 320/112 |
| 2005/0106454 A1 * | 5/2005 | Kozu et al. | 429/175 |

FOREIGN PATENT DOCUMENTS

| | | |
|---|---|---|
| EP | 1 487 033 A1 | 12/2004 |
| JP | 06-236750 | 8/1994 |
| JP | 11176418 A * | 7/1999 |
| JP | 2004-095268 | 3/2004 |
| JP | 2004095268 A * | 3/2004 |
| KR | 1020040100050 A | 12/2004 |
| WO | WO 03/069698 | 8/2003 |

OTHER PUBLICATIONS

European Search Report dated Jan. 16, 2006, for corresponding European Patent application 05110062.6.
Derwent Abstract, *Sealed nickel-zinc storage battery comprise spiral plate nickel oxide anode separate zinc cathod metal container interior coating*, May 8, 1978, 1 page, XP 002070099.
European Search Report dated Jan. 4, 2006 for corresponding European Patent Application No. 05109078.5.

* cited by examiner

*Primary Examiner* — Karie O'Neill Apicella
(74) *Attorney, Agent, or Firm* — Christie, Parker & Hale, LLP

(57) ABSTRACT

A lithium rechargeable battery including an electrode assembly having a first and second electrodes wound together with a separator interposed between them, a can containing the electrode assembly, and a cap plate coupled to the top opening of the can. The cap plate includes an electrolyte injection hole and a rib formed adjacent to the electrolyte injection hole.

12 Claims, 5 Drawing Sheets

LITHIUM RECHARGEABLE BATTERY

CROSS-REFERENCE TO RELATED APPLICATION

This application claims priority to and the benefit of Korean Patent Application No. 10-2004-0078188 filed Oct. 1, 2004 in the Korean Intellectual Property Office, the entire content of which is incorporated herein by reference.

BACKGROUND OF THE INVENTION

1. Field of the Invention

The present invention relates to a lithium rechargeable battery. In particular, the present invention relates to a lithium rechargeable battery having an improved electrolyte injection structure.

2. Description of the Prior Art

Based on the trend towards compact and lightweight portable electronic appliances, batteries having a small size and high capacity have become increasingly necessary as the power source for driving the appliances. In particular, lithium rechargeable batteries have an operating voltage of 3.6V, which is three times higher than that of nickel-hydrogen batteries or nickel-cadmium batteries widely used as the power supply of portable electronic appliances, as well as a high energy density per unit weight. For these reasons, lithium batteries are increasingly used in the industry.

The lithium rechargeable batteries create electric energy by means of oxidation and reduction reactions during intercalation/deintercalation of lithium ions at the positive and negative electrodes. As the active materials of the positive and negative electrodes of the lithium rechargeable batteries, materials enabling lithium ions to undergo reversible intercalation/deintercalation are used. In addition, an organic electrolyte or a polymer electrolyte is used to fill the space between the positive and negative electrodes.

For the positive electrode active material of the lithium rechargeable batteries, lithium-containing metal oxide is used, including lithium cobalt oxide ($LiCoO_2$), lithium nickel oxide ($LiNiO_2$), and lithium manganese oxide ($LiMnO_2$). For the negative electrode active material, lithium metal or lithium alloy has been used. When lithium metal is used, however, the batteries may explode as they tend to short-circuit due to the formation of dendrite. Therefore, lithium metal has been replaced by carbon-based materials, including amorphous carbon and crystalline carbon. The lithium rechargeable batteries are manufactured in various shapes including a cylinder type, a square type, and a pouch type.

FIG. 1 is an exploded perspective view showing a conventional lithium rechargeable battery. The lithium rechargeable battery is formed by placing an electrode assembly 12 including first and second electrodes 13, 15 and a separator 14 into a can 10 together with an electrolyte and sealing the top of the can 10 with a cap assembly 20.

The cap assembly 20 includes a cap plate 40, an insulation plate 50, a terminal plate 60, and an electrode terminal 30. The cap assembly 20 seals the can by being coupled to the top opening of the can while being insulated from the electrode assembly 12 by a separate insulation case 70.

The cap plate 40 is made of a metal plate with a size and a shape corresponding to the top opening of the can 10. The cap plate 40 has a centrally located terminal through-hole into which the electrode terminal 30 is inserted. A tubular gasket 35 is coupled to an outer surface of the electrode terminal to provide insulation between the electrode terminal 30 and the cap plate 40 when the electrode terminal 30 is inserted into the terminal through-hole 41. The cap plate 40 has an electrolyte injection hole 42 that is formed on a side thereof with a predetermined size and a safety vent (not shown) on the other side thereof. The safety vent is integrally formed by reducing the sectional thickness of the cap plate 40. After the cap assembly 20 is assembled to the top opening of the can 10, an electrolyte is injected via the electrolyte injection hole 42 which is then sealed by a plug 43.

The electrode terminal 30 is connected to a second electrode tab 17 of the second electrode 15 or to a first electrode tab 16 of the first electrode 13 and acts as a second or first electrode terminal, respectively. Insulation tape 18 is wound around portions through which the first and second electrode tabs 16, 17 protrude from the electrode assembly 12 to avoid a short circuit between the electrodes 13, 15. The first or second electrode may act as a positive or negative electrode.

In the lithium rechargeable battery, the electrolyte is a source for supplying ions and acts as a medium for enabling ions to move so that the battery can undergo reactions efficiently. Electrolyte injection is, therefore, a crucial factor in deciding the performance and life of the battery. Conventional methods for injecting electrolytes include an atmospheric injection method, a centrifugal injection method, and a vacuum injection method.

The vacuum injection method, one of the recently used methods for injection of electrolytes, includes various methods. A typical example thereof includes the following steps: an injection nozzle is attached to the electrolyte injection hole; the inside of the can is evacuated to a vacuum state using an evacuation means of an electrolyte injection apparatus; and a predetermined amount of electrolyte is supplied. Then, the electrolyte is injected into the can by means of the difference in pressure between the can's internal pressure and the atmospheric pressure.

When the electrolyte is injected by the above-mentioned method, however, the cap plate may bend due to the external force applied adjacent to the electrolyte injection hole thereof. If the cap plate is bent in this manner, sealing properties of the can may degrade.

SUMMARY OF THE INVENTION

A lithium rechargeable battery is provided including a rib formed adjacent to an electrolyte injection hole of a cap plate to prevent the cap plate from bending when an electrolyte is injected via the electrolyte injection hole.

The lithium rechargeable battery also includes an electrode assembly including first and second electrodes wound together with a separator interposed between them; a can containing the electrode assembly; and a cap plate coupled to the top opening of the can, wherein the cap plate comprises an electrolyte injection hole and at least one rib formed adjacent to the electrolyte injection hole.

The rib may be formed by pressing the upper or lower surface of the cap plate. The cap plate may have a stepped portion formed on the upper or lower surface thereof as the rib is formed. In one exemplary embodiment, the level difference between the stepped portion and the remaining portion is equal to or smaller than twice the thickness of the cap plate.

The rib may have a shape chosen from a rectangle, circle, semi-circle, ellipse, or a combination thereof.

BRIEF DESCRIPTION OF THE DRAWINGS

FIGS. 3b and 3c are sectional views taken along line A-A' of FIG. 3a.

FIGS. 4b and 4c are sectional views taken along line B-B' of FIG. 4a.

DETAILED DESCRIPTION

Figure 1:
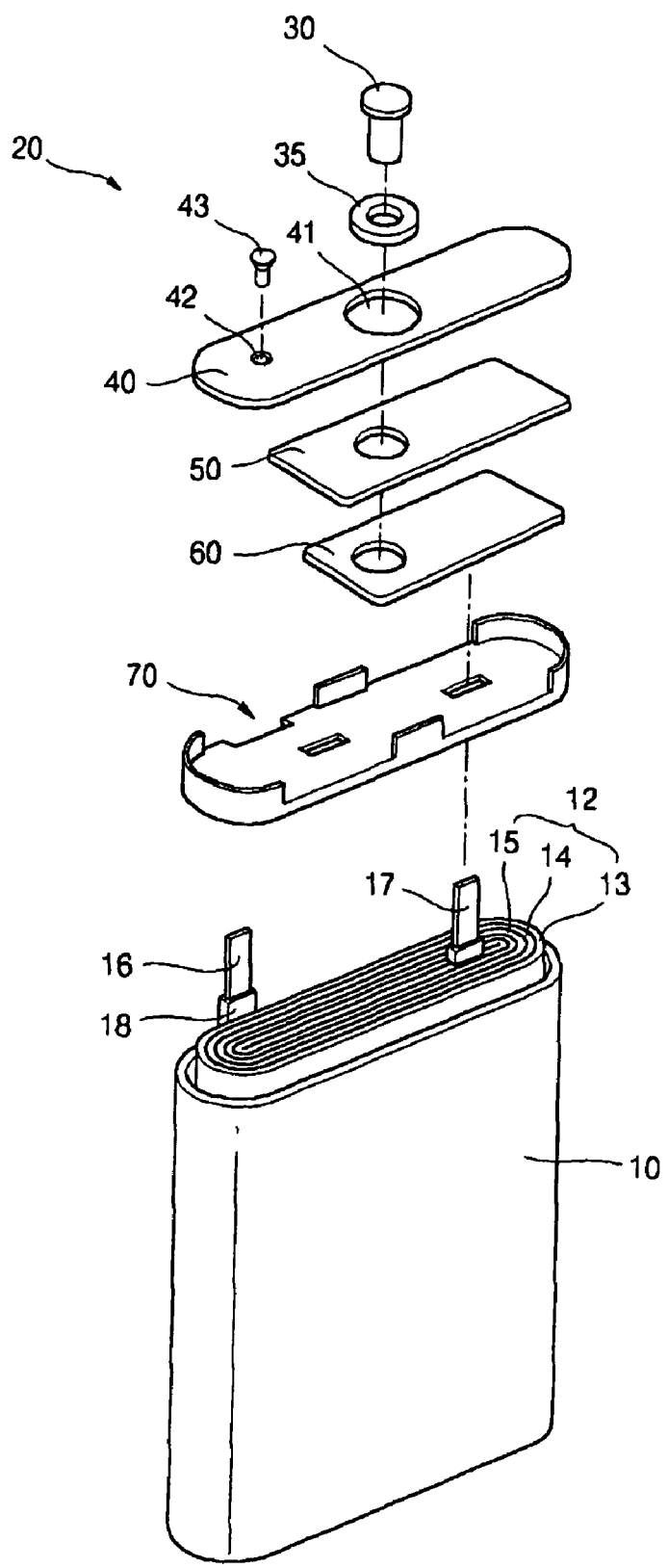
FIG. 1 is an exploded perspective view of a conventional lithium rechargeable battery.
Figure 2:
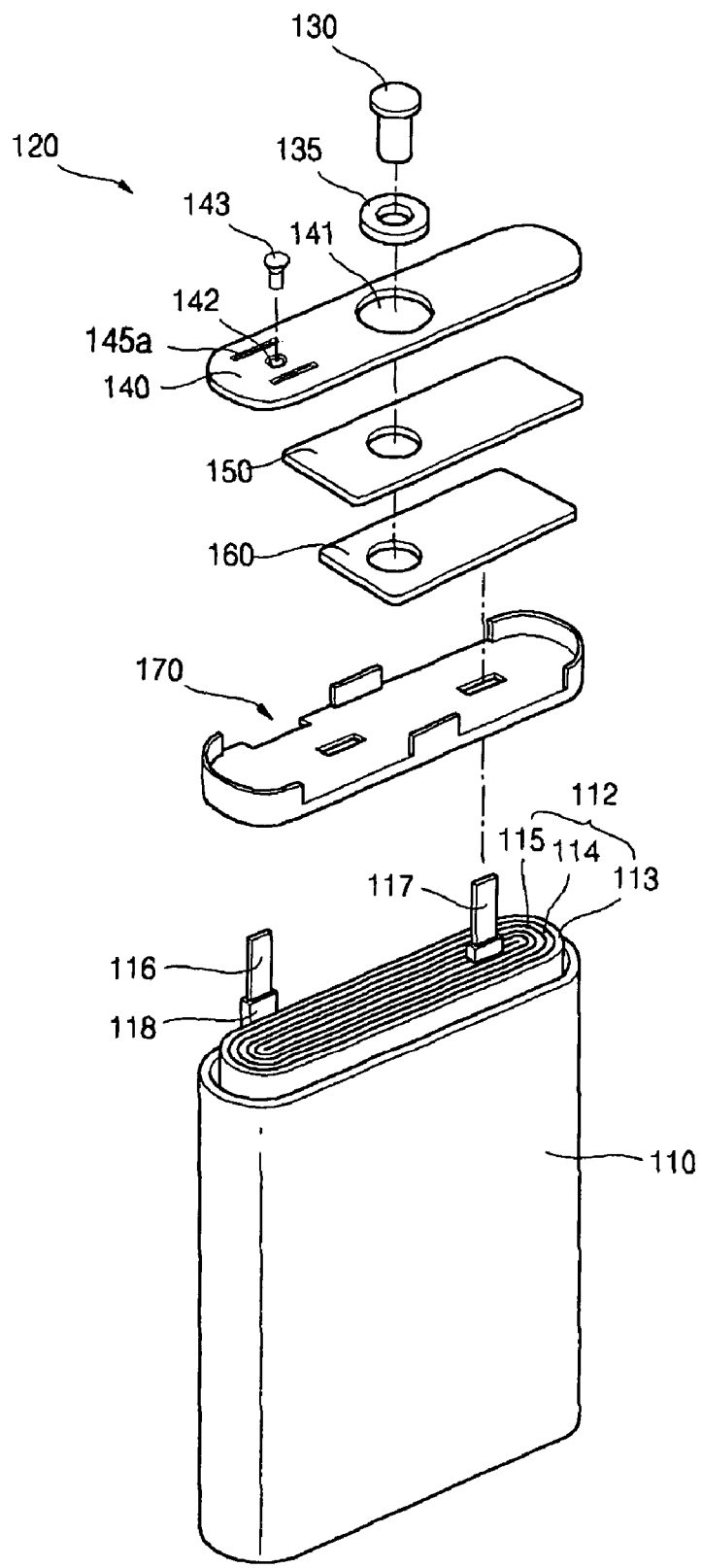
FIG. 2 is an exploded perspective view of a lithium rechargeable battery according to an exemplary embodiment of the present invention.

Referring to FIG. 2, a lithium rechargeable battery includes a can 110, an electrode assembly 112 contained in the can 110, and a cap assembly 120 coupled to the top of the can 110.

The can 110 has an approximately hexahedronal shape with an open top and is made of a metallic material which is light and ductile, for example, aluminum, aluminum alloy, or stainless steel, but the material is not limited herein. The can 110 may act as a terminal on its own.

The electrode assembly 112 includes a first electrode 113, a second electrode 115, and a separator 114. The first and second electrodes 113, 115 may be laminated onto each other with the separator 114 interposed between them and may be wound into a jelly roll configuration. The first and second electrodes 113, 115 have first and second electrode tabs 116, 117 respectively attached thereto while being drawn out upwards by welding, such as laser, ultrasonic, or resistance welding or with a conductive adhesive.

The first and second electrodes 113, 115 have opposite polarities and either may act as a positive or a negative electrode. Each of the first and second electrodes 113, 115 includes an electrode collector and an electrode active material (positive or negative electrode active material) that is applied to at least one surface of the collector.

When the first or second electrode 113, 115 is used as the positive electrode, its electrode collector may include, but is not limited to, stainless steel, nickel, aluminum, titanium, or an alloy thereof. It may also include aluminum or stainless steel which has been surface-treated with carbon, nickel, titanium, or silver. When the first or second electrode 113, 115 is used as the negative electrode, its electrode collector may include, but is not limited to, stainless steel, nickel, copper, titanium, or an alloy thereof. It may also include copper or stainless steel which has been surface-treated with carbon, nickel, titanium, or silver.

Conventional lithium-containing transition metal oxide or lithium chalcogenide compound may be used as the positive electrode active material, and, as a typical example, metal oxide such as $LiCoO_2$, $LiNiO_2$, $LiMnO_2$, $LiMn_2O_4$, or $LiNi_{1-x-y}Co_xM_yO_2$ ($0 \leq x \leq 1$, $0 \leq y \leq 1$, $0 \leq x+y \leq 1$, M indicating metal, such as Al, Sr, Mg, or La) may be used. Lithium metal, lithium alloy, or carbon materials including crystalline carbon, amorphous carbon, carbon composite, and carbon fiber may be used as the negative electrode active material.

The separator 114 serves to prevent a short circuit between the first and second electrodes 113, 115 and provides a flow path for lithium ions. The separator 114 may include polymer film based on polyolefin, such as polypropylene or polyethylene, multiple film thereof, a fine porous film, a woven fabric, or a non-woven fabric.

The cap assembly 120, which is coupled to the top of the can 110, includes a cap plate 140, an insulation plate 150, a terminal plate 160, and an electrode terminal 130.

The cap plate 140 may be made from a flat-plate type metallic material with a size and a shape corresponding to that of the top opening of the can 110. The cap plate 140 includes a centrally located terminal through-hole 141, an electrolyte injection hole 142 formed on a side thereof, and a rib 145a formed adjacent to the electrolyte injection hole 142. The cap plate 140 may be made from the same material as the can 110, particularly aluminum, aluminum alloy, or stainless steel, to improve the welding properties with the can 110. After electrolyte injection, the electrolyte injection hole 142 is coupled to a plug 143 and sealed.

The rib 145a may be positioned in the longitudinal direction of the cap plate 140 while being adjacent to the electrolyte injection hole 142. The rib 145a may be formed by pressing a portion of the upper surface of the cap plate 140 into generally rectangular shapes. The shape of the rib 145a is not limited herein and may be variously chosen from a circle, ellipse, semi-circle, and a combination thereof. The rib 145a provides the cap plate 140 with a predetermined degree of rigidity and alleviates local stress concentration or local deformation occurring to the cap plate 140 during electrolyte injection.

The electrode terminal 130 is inserted into the terminal through-hole 141 and has a tubular gasket 135 positioned on the outer surface thereof for electric insulation from the cap plate 140. The insulation plate 150 is positioned on the lower surface of the cap plate 140. The terminal plate 160 is positioned on the lower surface of the insulation plate 150. The bottom of the electrode terminal 130 is electrically connected to the terminal plate 160 with the insulation plate 150 interposed between them.

Any one of the first and second electrode tabs 116, 117 may be welded to the lower surface of the cap plate 140. If the second electrode tab 117 is welded to the terminal plate 160, it may be electrically connected to the electrode terminal 130. The first and second electrode tabs 116, 117 may be made of nickel.

The electrode assembly 112 has an insulation case 170 positioned on the top thereof to electrically insulate the electrode assembly 112 from the cap assembly 120 and to fix the position of the electrode assembly 112 and the first and second electrode tabs 116, 117. The insulation case 170 may be made of an insulating polymer resin, for example polypropylene (PP).

Figure 3A:
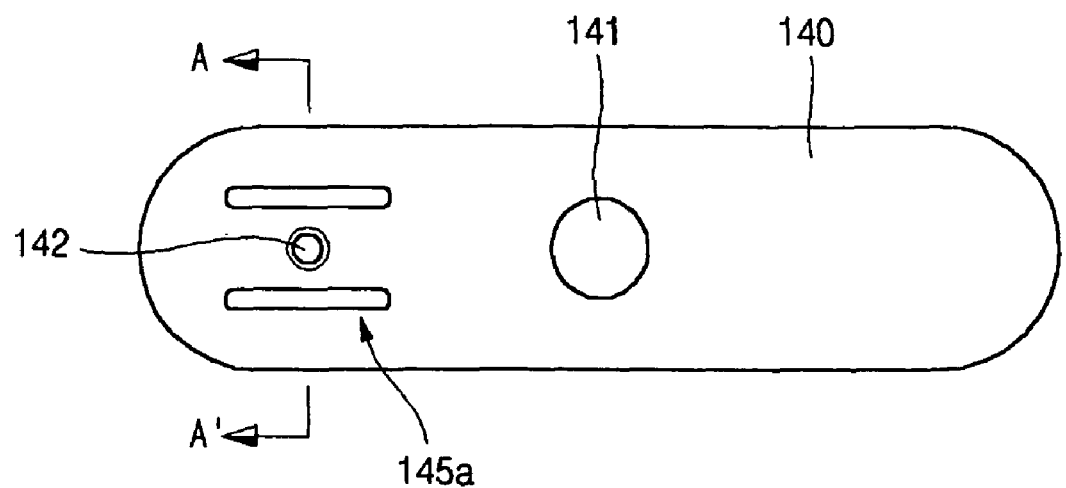
FIG. 3a is a top view of a cap plate shown in FIG. 2.
Figure 3B:
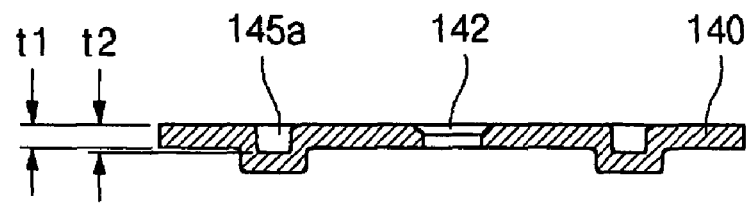
Figure 3C:
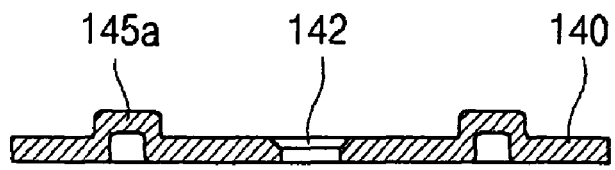

Referring to FIGS. 3a, 3b, and 3c, the cap plate 140 comprises a terminal through-hole 141, an electrolyte injection hole 142, and at least one anti-bending rib 145a formed adjacent to the electrolyte injection hole 142. Specifically, a pair of anti-bending ribs 145a are positioned adjacent to the electrolyte injection hole 142 in the longitudinal direction of the cap plate 140 parallel to each other. Alternatively, the ribs 145a may be positioned in the lateral direction, and may be formed adjacent to the electrolyte injection hole 142 continuously or discontinuously.

The ribs 145a may be formed by pressing the upper surface of the cap plate 140, as shown in FIG. 3b, or the lower surface thereof, as shown in FIG. 3c. When the upper surface of the cap plate 140 is pressed, as shown in FIG. 3b, the upper surface is recessed while forming stepped portions and protrusions protruding from the lower surface. When the lower surface of the cap plate 140 is pressed, the lower surface is recessed while forming stepped portions and protrusions protruding from the upper surface. The level difference $t_2$ between the stepped portions formed on the upper or lower surface of the cap plate 140, as it is recessed by pressing, and the remaining portion thereof may be equal to or less than double the thickness $t_1$ of the cap plate 140, and in one exemplary embodiment is equal to or smaller than the thickness $t_1$ of the cap plate 140. If the level difference $t_2$ is greater than double the thickness $t_1$ of the cap plate 140, excessive shaping stress may act on the cap plate 140 and degrade the strength of the cap plate or deform it.

Figure 4A:
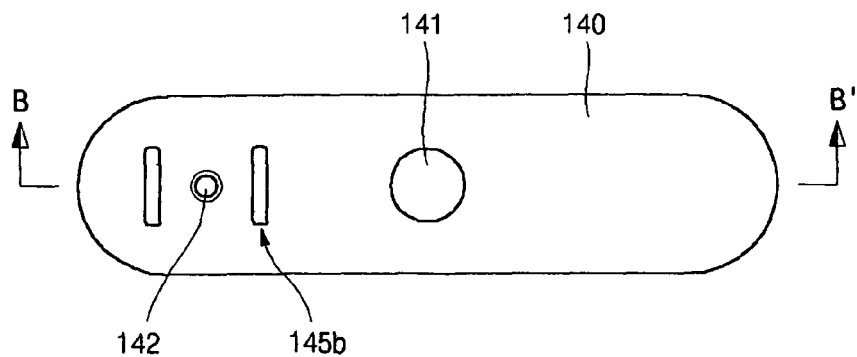
FIG. 4a is a top view of a cap plate according to another exemplary embodiment of the present invention.
Figure 4B:
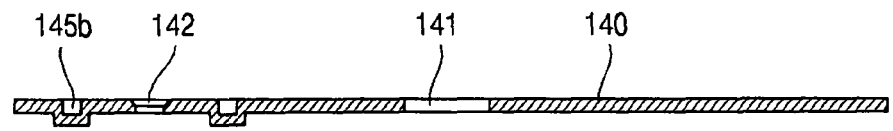
Figure 4C:
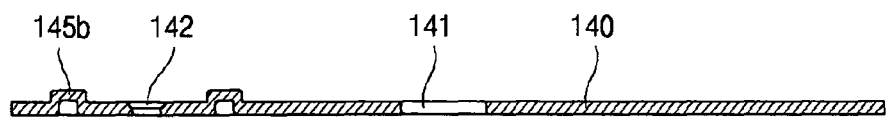

Referring to FIGS. 4a, 4b, and 4c, a pair of rectangular ribs 145b is positioned adjacent to the electrolyte injection hole 142 in the lateral direction of the cap plate 140 while being parallel to each other. The ribs 145b may be formed by pressing the upper or lower surface of the cap plate 140. Particularly, the upper or lower surface of the cap plate 140 is recessed a predetermined depth and forms stepped portions.

Figure 5:
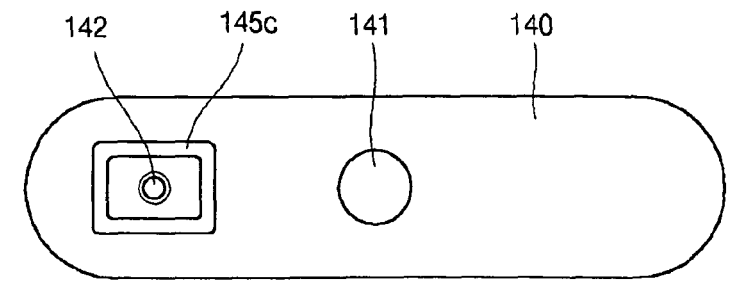
FIGS. 5 to 8 are top views of cap plates according to alternate embodiments of the present invention.
Figure 6:
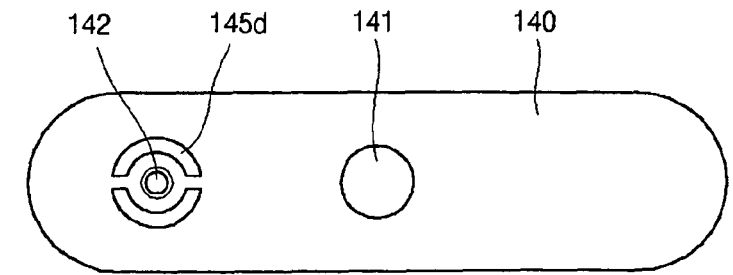
Figure 7:
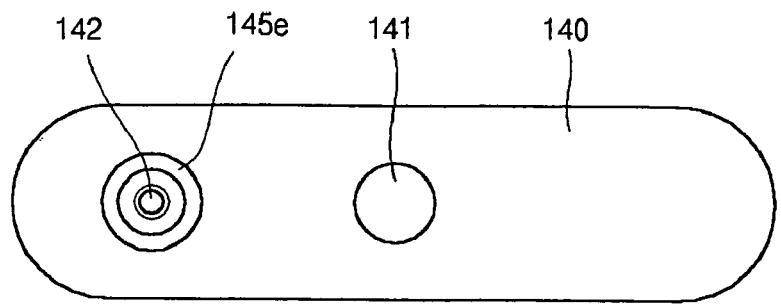
Figure 8:
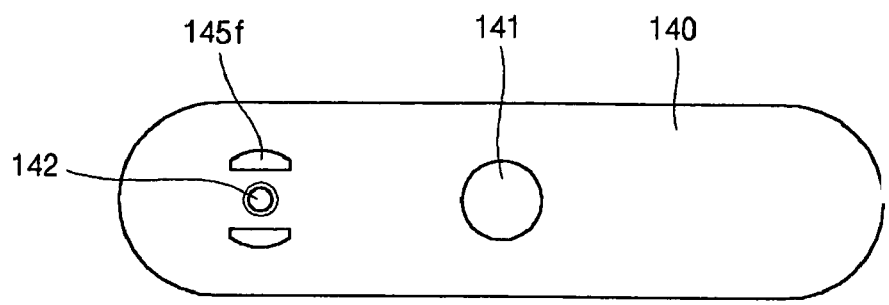

FIGS. 5 to 8 are top views of cap plates according to another exemplary embodiments of the present invention. Referring to FIG. 5, an anti-bending rib 145c is continuously formed around the electrolyte injection hole 142 of the cap plate 140 in a generally rectangular shape. Referring to FIG. 6, anti-bending ribs 145d are positioned around the electrolyte injection hole 142 of the cap plate 140 in a semi-circular shape. Referring to FIG. 7, an anti-bending rib 145e is continuously formed around the electrolyte injection hole 142 of the cap plate 140 in a circular shape. Referring to FIG. 8, a pair of anti-bending ribs 145f is positioned adjacent to the electrolyte injection hole 142 of the cap plate 140 in the horizontal direction, while being parallel to each other, in a shape having combined linear surfaces and curved surfaces.

In summary, the anti-bending ribs 145a, 145b, 145c, 145d, 145e, and 145f formed adjacent to the electrolyte injection hole 142 of the cap plate 140 reduce local stress concentration acting on the cap plate 140 when an electrolyte is injected via the electrolyte injection hole 142 and increase the strength of the cap plate 140 to prevent it from bending.

As mentioned above, the lithium rechargeable battery according to the present invention includes a rib formed adjacent to the electrolyte injection hole of the cap plate to prevent the cap plate from bending when an electrolyte is injected via the electrolyte injection hole.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A lithium rechargeable battery comprising:
   an electrode assembly including a first electrode and a second electrode wound together with a separator interposed between the first electrode and the second electrode;
   a can containing the electrode assembly;
   a cap plate having an electrolyte injection hole, the cap plate being coupled to an opening of the can;
   a plug sealing the electrolyte injection hole; and
   at least two ribs spaced from and equidistant from the electrolyte injection hole at at least two opposite sides of the electrolyte injection hole,
   wherein the at least two ribs are spaced from each other and from the plug and protrude from a cap plate surface distal from the electrode assembly and wherein the at least two ribs are integral with and made from the cap plate.

2. The lithium rechargeable battery of claim 1, wherein a height difference between the cap plate surface and a surface of the at least two ribs distal from the cap plate surface is equal to or smaller than twice a thickness of the cap plate.

3. The lithium rechargeable battery of claim 1, wherein a height difference between the cap plate surface and an external surface of the at least two ribs distal from the cap plate surface is equal to or smaller than a thickness of the cap plate.

4. The lithium rechargeable battery of claim 1, wherein the at least two ribs have a shape of a semi-circle, ellipse, or a combination thereof.

5. The lithium rechargeable battery of claim 1, wherein the at least two ribs comprise a parallel pair of ribs spaced from the electrolyte injection hole.

6. The lithium rechargeable battery of claim 5, wherein the at least two ribs are spaced from the electrolyte injection hole in a longitudinal direction of the cap plate.

7. The lithium rechargeable battery of claim 5, wherein the at least two ribs are spaced from the electrolyte injection hole in a lateral direction of the cap plate.

8. The lithium rechargeable battery of claim 1, wherein the cap plate comprises aluminum, aluminum alloy, or stainless steel.

9. A cap plate for a rechargeable battery, the cap plate adapted to be coupled to and sealed to a can of the rechargeable battery, the cap plate comprising a planar plate having:
   a terminal through-hole;
   an electrolyte injection hole; and
   at least two ribs spaced from and equidistant from the electrolyte injection hole at at least two opposite sides of the electrolyte injection hole, the at least two ribs spaced entirely from each other and protruding from a cap plate surface wherein the at least two ribs are integral with and made from the cap plate.

10. The cap plate of claim 9, wherein a height difference between the plate surface and a surface of the at least two ribs is equal to or smaller than twice a thickness of the cap plate.

11. The cap plate of claim 9, wherein a height difference between the cap plate surface and a surface of the at least two ribs is equal to or smaller than the thickness of the cap plate.

12. The cap plate of claim 9, wherein the at least two ribs have a shape of a semi-circle, ellipse, or a combination thereof.

* * * * *